(No Model.)  3 Sheets—Sheet 1.

H. O. THOMAS.
MACHINE FOR BALING TREES.

No. 511,917. Patented Jan. 2, 1894.

Witnesses
Chas. H. Durand
W. S. Duvall

Inventor
Henry O. Thomas
By his Attorneys,
C. A. Snow & Co.

(No Model.) 3 Sheets—Sheet 2.

H. O. THOMAS.
MACHINE FOR BALING TREES.

No. 511,917. Patented Jan. 2, 1894.

Witnesses
Chas. H. Ourand
W. S. Duvall

Inventor
Henry O. Thomas
By his Attorneys,
C. A. Snow & Co.

THE NATIONAL LITHOGRAPHING COMPANY,
WASHINGTON, D. C.

(No Model.) 3 Sheets—Sheet 3.

H. O. THOMAS.
MACHINE FOR BALING TREES.

No. 511,917. Patented Jan. 2, 1894.

Witnesses
Chas. H. Ourand
W. S. Duvall

Inventor
Henry O. Thomas
By his Attorneys,
C. A. Snow & Co.

UNITED STATES PATENT OFFICE.

HENRY O. THOMAS, OF KIMBALL, ASSIGNOR OF ONE-HALF TO JOHN W. STEVENSON, OF NORTH BEND, NEBRASKA.

MACHINE FOR BALING TREES.

SPECIFICATION forming part of Letters Patent No. 511,917, dated January 2, 1894.

Application filed February 20, 1893. Serial No. 463,113. (No model.)

*To all whom it may concern:*

Be it known that I, HENRY O. THOMAS, a citizen of the United States, residing at Kimball, in the county of Kimball and State of Nebraska, have invented a new and useful Machine for Baling Trees, of which the following is a specification.

My invention relates to improvements in machines for baling young trees; the objects in view being to produce a cheap and simple machine so constructed as to receive the trees at either or both sides thereof, whereby one or more operators may be employed with convenience and advantage; which will lie flat upon the ground during the reception of the trees and which will elevate the bale during the application of the binder; and furthermore, which will conveniently compress the bundle and may be readily operated with slight labor.

Various other objects and advantages of the invention will appear in the following description and the novel features thereof will be particularly pointed out in the claims.

Figure 1:
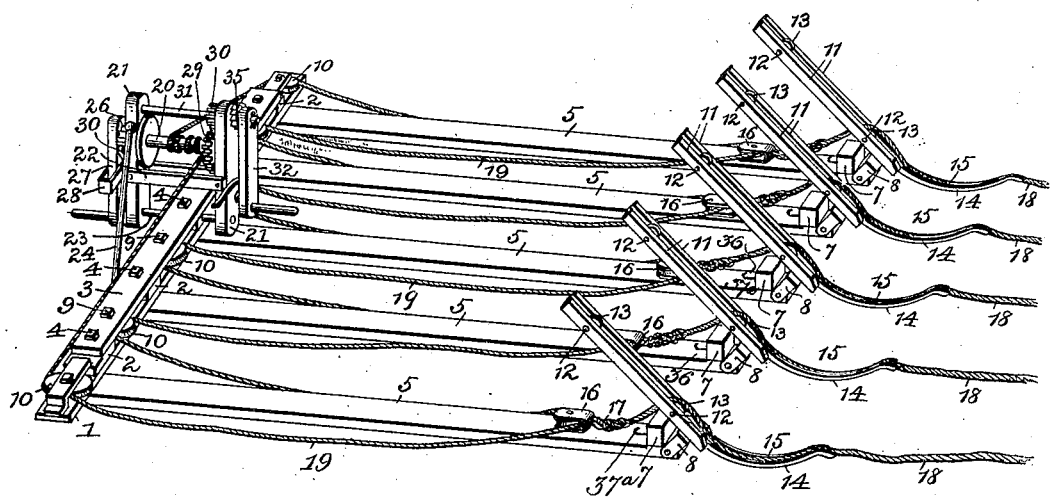
Figure 2:
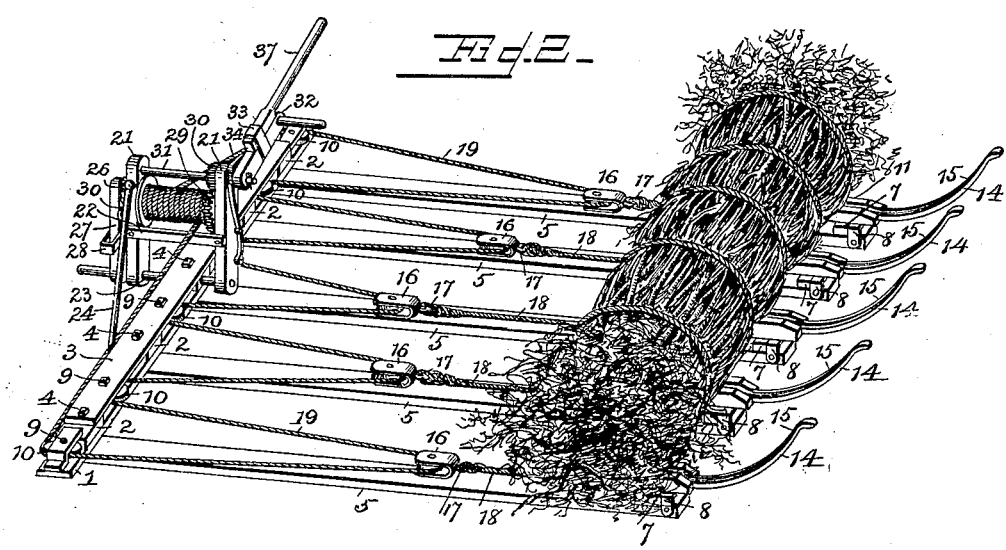
Figure 3:
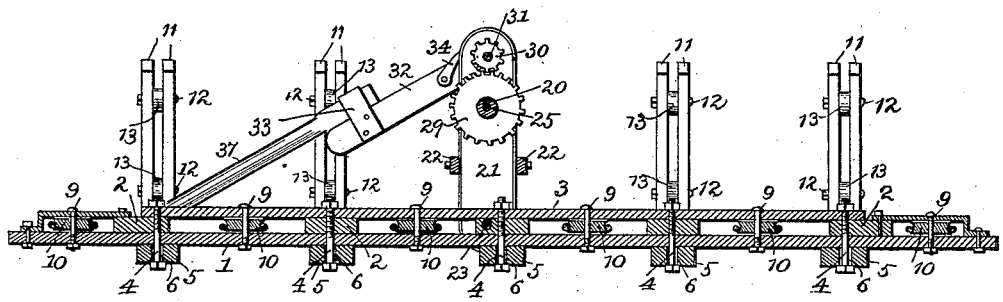
Figure 4:
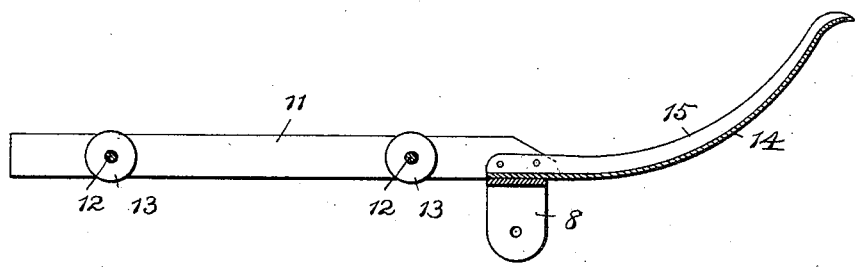
Figure 5:
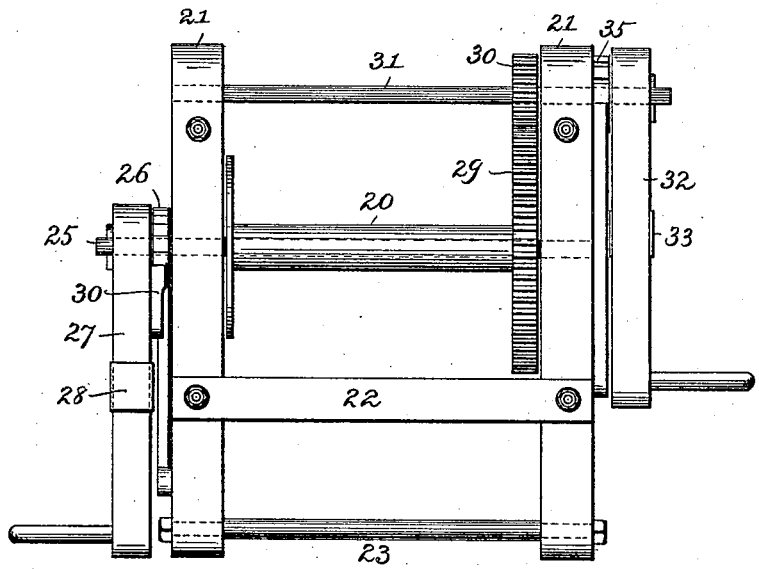
Figure 6:
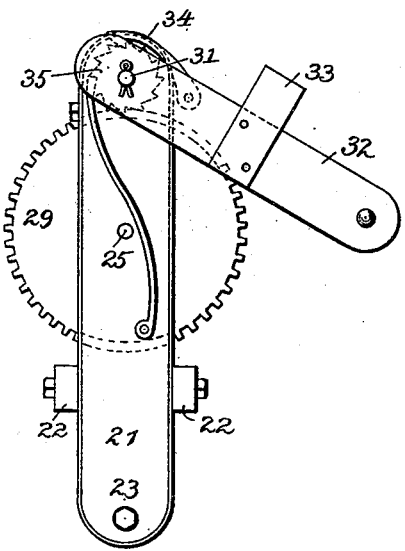

Referring to the drawings, Figure 1 is a perspective view of a machine constructed in accordance with my invention, the same being in position to receive the trees to be baled. Fig. 2 is a perspective view of the machine the same being in the act of baling. Fig. 3 is a transverse sectional view of Fig. 1 looking toward the pivoted arms. Fig. 4 is a detail of one of said arms in longitudinal section. Fig. 5 is a detail of the winding-device. Fig. 6 is an end elevation thereof.

Like numerals of reference indicate like parts in all the figures of the drawings.

In practicing my invention I construct what I term the head-piece of the machine as follows: 1 designates the base-strip, upon which at intervals spacing-blocks 2, are located, and these are surmounted by an upper strip 3, which at intervals has passed therethrough bolts 4, the same passing down through the blocks and base-strip 1. The heads of the bolts are upon the under side of the base-strip, and said bolts are applied loosely, whereby I am enabled to slip over said bolts between the head and base-plate the inner ends of a series of base-sills 5, which ends are provided with slots 6 for such purpose. The sills 5 extend outward from the head-piece and are parallel to each other, and each has secured upon its upper side near its outer end a stationary block or rest 7 whose function will be hereinafter described, and beyond the same has its end embraced by and pivotally connected with an inverted U-shaped yoke 8, whose function will likewise be described. At intervals agreeing with the spaces between the sills 5 I pivot upon bolts 9 loose pulleys 10.

Upon each of the yokes 8 there is rigidly secured a baling-arm, and each baling-arm consists as shown of a pair of opposite strips 11 secured together by bolts 12 and slightly spaced apart. Each of the bolts 12 is provided with a small loose roller 13, and between the outer ends of the strips curved prongs 14 are secured and project therefrom. These prongs are provided in their concaved sides with grooves 15 and have their extremities turned down and beveled so as to form no obstruction when lying upon the ground to the reception or easy passage thereover of the young trees. When the series of baling-arms are lowered they are prevented from descending at their inner ends below the horizontal plane through the medium of the blocks 7 heretofore mentioned.

Upon each of the sills 5 a pulley-sheaf 16, is loosely mounted, said pulley sheaf having at its front end an eye 17, in each of which is secured a baling-rope 18. This baling-rope 18 passes between the strips 11 of the baling-arm directly in front thereof, and after passing over the lower pulley 13 takes within the groove 15 of the prong 14 and extends beyond the same lying upon the ground when the machine is in the position for baling. An evener-rope 19 has its opposite ends secured to and reversely wound upon the winding-drum 20, whose construction I will hereinafter describe, and passes therefrom to the end pulleys 10 of the series, around the same outwardly, around the pulley of the sheaf 16, back around the next or second pulley 10, thence out again over the next or second pulley-sheaf 16, and so on throughout the series, being arranged in this zigzag manner, all as clearly shown by the drawings, so that as will be obvious a winding of the drum 20 will cause the sheaves to move inward and draw upon the baling-ropes 18 the effect of which will hereinafter appear.

Any suitable construction of winding-device may be employed, and I have herein shown one particularly adapted for the purpose for which it is employed and which I will now proceed to describe:

21 designates a pair of opposite standards, secured by side-bars 22, near their middles, and at their lower ends by a connecting-bolt 23, which passes through one of the blocks 2 of the head-piece or section. Suitable braces 24, extend from the standards and serve to make the same rigid. The drum 20 is mounted on a shaft 25, which extends beyond the outer standard 21, and is there provided with a ratchet-wheel 26, and beyond the same carries a loose crank 27, which has a keeper 28, located thereon. A dog or pawl 30, is mounted on the crank and is adapted to engage the teeth of the ratchet-wheel 26. Upon the shaft 25, at the inner side of the drum 20, there is located a gear-wheel 29, and the same engages with a small pinion 30, which is located upon an upper countershaft 31, which is journaled in the upper ends of the standards 21, carries a loose crank 32, having a keeper 33, and a pawl 34, that engages with a ratchet-wheel 35, fast upon the shaft.

37 designates a lever, whose lower end may be inserted in the keeper of either of the cranks, whereby the crank may oscillate through the medium of the lever, and its dog or pawl engaging with the ratchet-wheel will serve to rotate the same and hence impart motion to the drum.

In operation the parts are placed in the position shown in Fig. 1, and the operators working from one or both sides throw the required quantity of trees upon the prongs and baling-ropes of the machine, the baling-arms being in the inclined position shown in Fig. 1, wherein their prongs are resting upon the ground. After the proper quantity of trees has been placed in position the free ends of the baling-ropes are carried over the bundle and are passed under the upper set of pulleys 13, around the inner ends of the baling-arms and are tucked into those portions of the baling-ropes that encompass the bundle. The two cranks are now operated so as to draw upon the evener-rope, thus moving inward the entire series of sheaves and binding the baling-ropes upon the bundle. After the cranks have been operated to draw the evener-rope in and wind the same upon the drum the lever is placed in position in the keeper of one crank and operated back and forth so as to increase the tension and hence pack more snugly the bundle of trees. This inward movement of the evener-rope, it will be observed, has elevated or swung the baling-arms together with their bundle to a horizontal position over upon the sills 5, so that the baling-arms rest upon the blocks and readily permit of the introduction around the bale or bundle of the binder, which after having been placed in position and secured serves to maintain the bale intact, after which the baling-ropes are removed, the tension thereof being decreased by a release of the pawls from the ratchet-wheels.

In rear of the blocks 7 hooks 37ᵃ are located, so that when it is desired to bale plants that are not as long as the machine is wide, and a certain number of the arms 11 and the baling-ropes 18 are therefore not needed, the pulley-blocks 16 may have their eyes 17 engaged over the hooks, and hence I obviate the necessity of taking up the slack of rope that would otherwise occur were these parts not made fast.

From the foregoing description in connection with the accompanying drawings it will be seen that I have provided an exceedingly cheap and simple device adapted to bale trees of the larger size by reason of the fact that it rests flatly upon the ground, or in other words, bales from the ground, requiring no elevating of the trees or bundles when in the act of baling, the whole being accomplished through a cheap and simple winding medium which at the same time applies a proper tension to the baling-ropes and thereby compactly compresses the mass for the subsequent application of the binder.

Having described my invention, what I claim is—

1. In a machine of the class described, the combination with a base, a winding-mechanism located at one end thereof, a series of pivoted bale-arms arranged at the opposite end thereof, loose pulleys arranged upon the base in rear of the bale-arms, bale-ropes connected to the pulleys and extending loosely through and beyond the arms, an evener-rope connected to the pulleys and to the winding-mechanism, substantially as specified.

2. In a machine of the class described, the combination with a base, a series of baling-arms located at one end thereof, and a winding device at the opposite end, of pulleys located upon the base and in rear of the arms, baling-ropes leading from the pulleys passing loosely through and beyond the arms, and an evener-rope connected with the pulleys and leading to the winding-device, substantially as specified.

3. In a machine of the class described, the combination with a base provided at its outer end with a series of rests, a series of baling-arms pivoted on the base in front of the rests, of a winding-device located at the opposite end of the base, a series of pulleys, baling-ropes connected to the pulleys and extending loosely through and beyond the arms, and an evener-rope connected to the pulleys and extending to the winding-device, substantially as specified.

4. In a machine of the class described, the combination with a base, a series of baling-arms loosely pivoted to the outer end of the base and provided with curved prongs at their outer ends, of a winding-device located at the opposite end of the base, pulleys arranged in rear of the arms, an evener-rope arranged in the pulleys and connected to the winding-device, and baling-ropes connected to the pulleys and extending beyond the arms, substantially as specified.

5. In a machine of the class described, the combination with a base, a series of slotted baling-arms pivoted thereto and provided near their upper and lower ends with rollers, of a winding-device at the opposite end of the base, pulleys arranged in rear of the arms, an evener-rope connected to the winding-device and passed through the pulleys, and baling-ropes connected to the pulleys and passed outwardly through and beyond the slots in the arms, substantially as specified.

6. In a machine of the class described, the combination with a base, a series of slotted baling-arms pivoted to the outer end of the base, each provided with a curved prong forming a continuation of the arm and having its upper side provided with a groove, of a winding-device located at the opposite side of the base, a series of pulleys mounted on the base in rear of the slotted arms, an evener-rope passed through the pulleys and connected to the winding-device, and baling-ropes passed through the slots in the arms and lying in and extending beyond the groove in the prongs, substantially as specified.

7. In a machine of the class described, the combination with a series of sills, a series of baling-arms pivoted to the outer ends of the sills, a pulley-carrying head secured to the inner ends of the sills, and loose pulleys mounted on each of the sills in rear of the arms, baling-ropes secured to the loose pulleys and extending beyond the arms, and an evener-rope passed back and forth through the front and rear pulleys and connected at its ends to the winding-device, substantially as specified.

8. In a machine of the class described, the combination with the base-strip 1, the space-blocks 2, the cross-strip 3, the bolts 4 passing through the blocks and strips, the intermediate pulleys 10, the sills 5, the loose pulleys 16 arranged thereon, the rests 7, the inverted U-shaped yokes 8 pivoted to the outer ends of the sills, and the baling-arms mounted on the yokes, of the winding-device, the evener-rope connected to the winding-device and passed back and forth in a zigzag manner around the stationary and movable pulleys, and the baling ropes leading from the movable pulleys, substantially as specified.

9. In a machine of the class described, the combination with the base, the outer pivoted baling-arms, the series of loose pulleys in rear of the arms and the inner series of stationary pulleys upon the base, of the opposite standards 21 and the shafts 25 and 31, the pinion 30 carried by the upper shaft 31, the pawls, ratchet-wheels and cranks mounted on the opposite ends of the shaft, the windlass mounted on the shaft 25, the gear-wheel located at one side of the windlass, the evener-rope 19 passed back and forth around the inner and outer pulleys and having its terminals reversely wound upon the drum, and the baling-ropes connected to the outer pulleys and extending beyond the baling-arms, substantially as specified.

10. In a machine of the class described, the combination with a base provided at its outer end with a series of rests, a series of baling-arms pivoted on the base in front of the rests, of a winding-device located at the opposite end of the base, a series of pulleys, baling-ropes connected to the pulleys and extending beyond the arms, hooks located at the rear sides of the rests and adapted to engage with the pulleys, and an evener-rope connected to the pulleys and extending to the winding-device, substantially as specified.

In testimony that I claim the foregoing as my own I have hereto affixed my signature in the presence of two witnesses.

HENRY O. THOMAS.

Witnesses:
W. W. HALL,
ERNEST KERN.